United States Patent
Jo

(10) Patent No.: US 12,491,877 B2
(45) Date of Patent: Dec. 9, 2025

(54) SYSTEM FOR DRIVER ASSISTANCE AND METHOD FOR DRIVER ASSISTANCE

(71) Applicant: HL KLEMOVE CORP., Incheon (KR)

(72) Inventor: Eunsan Jo, Seoul (KR)

(73) Assignee: HL KLEMOVE CORP., Incheon (KR)

(*) Notice: Subject to any disclaimer, the term of this patent is extended or adjusted under 35 U.S.C. 154(b) by 231 days.

(21) Appl. No.: 18/136,618

(22) Filed: Apr. 19, 2023

(65) Prior Publication Data

US 2023/0339461 A1 Oct. 26, 2023

(30) Foreign Application Priority Data

Apr. 20, 2022 (KR) .................. 10-2022-0048709

(51) Int. Cl.
*B60W 30/095* (2012.01)
*B60W 30/09* (2012.01)

(52) U.S. Cl.
CPC ........ *B60W 30/0956* (2013.01); *B60W 30/09* (2013.01); *B60W 2420/403* (2013.01);
(Continued)

(58) Field of Classification Search
CPC ...... B60W 10/18; B60W 10/20; B60W 30/08; B60W 30/09; B60W 30/095;
(Continued)

(56) References Cited

U.S. PATENT DOCUMENTS

2002/0036584 A1* 3/2002 Jocoy ............. G08G 1/164
342/72
2017/0113665 A1 4/2017 Mudalige et al.
(Continued)

FOREIGN PATENT DOCUMENTS

| JP | 2011-2869 | 1/2011 |
|---|---|---|
| KR | 10-2015-0068426 | 6/2015 |
| KR | 10-2018-0070384 | 6/2018 |

OTHER PUBLICATIONS

Office Action (1st) dated Jun. 23, 2025 for Korean Patent Application No. 10-2022-0048709 and its English translation provided by Applicant's foreign counsel.

*Primary Examiner* — Brandon Z Willis
(74) *Attorney, Agent, or Firm* — WOMBLE BOND DICKINSON (US) LLP

(57) ABSTRACT

Disclosed herein is a system includes a camera having a field of view around a host vehicle and configured to output image data, a radar having a sensing area around the host vehicle and configured to output radar data, and a controller electrically connected to the camera and the radar. The controller may determine a future traveling path of the host vehicle based on a preceding direction of the host vehicle from the image data and/or the radar data, determine a future traveling path of a crossing vehicle based on a preceding direction of the crossing vehicle moving in a direction crossing the preceding direction of the host vehicle, determine a point at which the future traveling path of the host vehicle crosses the future traveling path of the crossing vehicle as a predicted collision position, determine whether yielding intention of a driver of the crossing vehicle is present when the crossing vehicle approaches the predicted collision position, and avoid a collision with the crossing vehicle based on the yielding intention of the driver of the crossing vehicle.

20 Claims, 7 Drawing Sheets

(52) U.S. Cl.
CPC ............... *B60W 2420/408* (2024.01); *B60W 2554/4045* (2020.02); *B60W 2554/4046* (2020.02); *B60W 2554/80* (2020.02)

(58) Field of Classification Search
CPC ......... B60W 30/0953; B60W 30/0956; B60W 30/18154; B60W 30/18159; B60W 40/02; B60W 40/04; B60W 40/08; B60W 40/09; B60W 40/10; B60W 40/107; B60W 50/0097; B60W 60/001; B60W 60/0015; B60W 60/0018; B60W 60/0027; B60W 60/00272; B60W 2420/403; B60W 2420/408; B60W 2510/202; B60W 2520/06; B60W 2520/10; B60W 2520/125; B60W 2520/105; B60W 2520/28; B60W 2540/18; B60W 2554/40; B60W 2554/4042; B60W 2554/4045; B60W 2554/4046; B60W 2554/80; B60W 2556/45; B60W 2710/18; B60W 2710/20; B60W 2754/10; G01S 13/93; G01S 13/931; G01S 2013/9318; G01S 2013/93185

See application file for complete search history.

(56) References Cited

U.S. PATENT DOCUMENTS

| | | | |
|---|---|---|---|
| 2019/0243371 A1* | 8/2019 | Nister | G05D 1/0255 |
| 2019/0367022 A1* | 12/2019 | Zhao | B60W 30/0956 |
| 2021/0323547 A1* | 10/2021 | Kozono | B60W 40/105 |
| 2022/0135029 A1* | 5/2022 | Poubel Orenstein | B60W 30/0953 701/301 |
| 2023/0037767 A1* | 2/2023 | Yang | G08G 1/167 |

* cited by examiner

SYSTEM FOR DRIVER ASSISTANCE AND METHOD FOR DRIVER ASSISTANCE

CROSS-REFERENCE TO RELATED APPLICATION

This application claims the benefit of Korean Patent Application No. 10-2022-0048709, filed on Apr. 20, 2022 in the Korean Intellectual Property Office, the disclosure of which is incorporated herein by reference.

BACKGROUND

1. Field

Embodiments of the present disclosure relate to a system and method capable of preventing collision accidents at intersections.

2. Description of the Related Art

Generally, a collision risk degree determination logic is essential to prevent accidents and safely pass at intersections that are commonly encountered among various scenarios to cope with for the implementation of autonomous traveling in city roads.

Conventionally, a degree of risk of collision at intersections is determined based on a time to collision (TTC) between a host vehicle and nearby vehicles.

However, in many cases, it is difficult to ensure safety in actual intersection situations in which unpredicted conditions and various uncertainties are present in the conventional methods. In fact, accidents often occur due to the misunderstanding of the intentions of nearby vehicles at intersections in the downtown. Conversely, when the degree of the risk of collision is very conservatively determined to ensure safety, effective control may not be performed and traffic flows at intersections may be hindered.

SUMMARY

Therefore, it is an aspect of the present disclosure to provide a system and method capable of predicting the traveling intention of a crossing vehicle at an intersection, determining a degree of risk of collision, and predicting the risk of collision in advance, thereby safely and efficiently operating a host vehicle.

In accordance with one aspect of the present disclosure, a system includes a camera having a field of view around a host vehicle and configured to output image data, a radar having a sensing area around the host vehicle and configured to output radar data, and a controller electrically connected to the camera and the radar. The controller may determine a future traveling path of the host vehicle based on a preceding direction of the host vehicle from the image data and/or the radar data, determine a future traveling path of a crossing vehicle based on a preceding direction of the crossing vehicle moving in a direction crossing the preceding direction of the host vehicle, determine a point at which the future traveling path of the host vehicle crosses the future traveling path of the crossing vehicle as a predicted collision position, determine whether yielding intention of a driver of the crossing vehicle is present when the crossing vehicle approaches the predicted collision position, and avoid a collision with the crossing vehicle based on the yielding intention of the driver of the crossing vehicle.

The controller may determine a minimum arrival time and a maximum arrival time at which the crossing vehicle arrives at a position at which the crossing vehicle stops based on the yielding intention of the driver of the crossing vehicle, compare a time to collision (TTC) between the host vehicle and the crossing vehicle with the minimum arrival time and the maximum arrival time, determine a risk of collision between the host vehicle and the crossing vehicle based on the comparing of the TTC with the minimum arrival time and the maximum arrival time and avoid a collision with the crossing vehicle based on the risk of collision between the host vehicle and the crossing vehicle.

The controller may compare a braking profile when the crossing vehicle stops at the predicted collision position with an acceleration of the crossing vehicle in an intelligent driver model (IDM) which is an intelligent driver model, and determine whether the crossing vehicle yields when the crossing vehicle approaches the predicted collision position based on the comparing of the braking profile with the acceleration of the crossing vehicle.

The controller may estimate whether the driver of the crossing vehicle intends to yield using a membership function into which an acceleration difference between the braking profile and the acceleration of the crossing vehicle is input.

The controller may change a response time of the driver of the crossing vehicle depending on the yielding intention of the driver of the crossing vehicle, and determine the maximum arrival time and the minimum arrival time based on acceleration or deceleration of the crossing vehicle during the response time.

The controller may determine, as the maximum arrival time, an arrival time when the crossing vehicle accelerates and then decelerates during the response time, and determine, as the minimum arrival time, an arrival time when the crossing vehicle travels at a constant speed and then decelerates during the response time.

The controller may determine, as the maximum arrival time, an arrival time when the crossing vehicle accelerates and then relatively slowly decelerates during the response time, and determine, as the minimum arrival time, an arrival time when the crossing vehicle travels at the constant speed time and then relatively suddenly decelerates during the response.

The controller may change the response time of the driver of the crossing vehicle so that a response time of the driver of the crossing vehicle when the driver of the crossing vehicle intends to yield is shorter than a response time when the driver of the crossing vehicle does not intend to yield.

The controller may determine that there is the risk of collision between the host vehicle and the crossing vehicle when the TTC between the host vehicle and the crossing vehicle is in a time range between the minimum arrival time and the maximum arrival time.

The controller may determine the yielding intention of the driver of the crossing vehicle using an IDM which is an intelligent driver model. The IDM may include a driver model that allows the host vehicle to travel while safely maintaining an inter-vehicle distance according to an acceleration.

In accordance with another aspect of the present disclosure, a method includes acquiring, by a camera having a field of view around a host vehicle, image data, acquiring, by a radar having a sensing area around the host vehicle, radar data, determining a future traveling path of the host vehicle based on a preceding direction of the host vehicle from the image data and/or the radar data, determining a future traveling path of a crossing vehicle based on a preceding direction of the crossing vehicle moving in a direction crossing the preceding direction of the host vehicle, determining a point at which the future traveling path of the host vehicle crosses the future traveling path of the crossing vehicle as a predicted collision position, estimating whether a driver of the crossing vehicle intends to yield when the crossing vehicle approaches the predicted collision position, and avoiding a collision with the crossing vehicle based on the yielding intention of the driver of the crossing vehicle.

The avoiding of the collision with the crossing vehicle may include determining a minimum arrival time and a maximum arrival time at which the crossing vehicle arrives at a position at which the crossing vehicle stops based on the yielding intention of the driver of the crossing vehicle, comparing a TTC between the host vehicle and the crossing vehicle with the minimum arrival time and the maximum arrival time, determining a risk of collision between the host vehicle and the crossing vehicle based on the comparing of the TTC with the minimum arrival time and the maximum arrival time and avoiding a collision with the crossing vehicle based on the risk of collision between the host vehicle and the crossing vehicle.

The estimating of whether the driver of the crossing vehicle intends to yield may include comparing a braking profile when the crossing vehicle stops at the predicted collision position with an acceleration of the crossing vehicle in an IDM, which is an intelligent driver model, and estimating whether the crossing vehicle yields when the crossing vehicle approaches the predicted collision position based on the comparing of the braking profile with the acceleration of the crossing vehicle.

The estimating of whether the driver of the crossing vehicle intends to yield may include estimating whether the driver of the crossing vehicle intends to yield using a membership function into which an acceleration difference between the braking profile and the acceleration of the crossing vehicle is input.

The estimating of the minimum arrival time and the maximum arrival time may include changing a response time of the driver of the crossing vehicle depending on the yielding intention of the driver of the crossing vehicle, and determining the maximum arrival time and the minimum arrival time based on acceleration or deceleration of the crossing vehicle during the response time.

The estimating of the minimum arrival time and the maximum arrival time may include determine, as the maximum arrival time, an arrival time when the crossing vehicle accelerates and then decelerates during the response time, and determine, as the minimum arrival time, an arrival time when the crossing vehicle travels at a constant speed and then decelerates during the response time.

The estimating of the minimum arrival time and the maximum arrival time may include determine, as the maximum arrival time, an arrival time when the crossing vehicle accelerates and then relatively slowly decelerates during the response time, and determine, as the minimum arrival time, an arrival time when the crossing vehicle travels at the constant speed and then relatively suddenly decelerates during the response time.

The estimating of the minimum arrival time and the maximum arrival time may include changing the response time of the driver of the crossing vehicle so that a response time of the driver of the crossing vehicle when the driver of the crossing vehicle intends to yield is shorter than a response time when the driver of the crossing vehicle does not intend to yield.

The determining of the risk of collision between the host vehicle and the crossing vehicle may include determining that there is the risk of collision between the host vehicle and the crossing vehicle when the TTC between the host vehicle and the crossing vehicle is in a time range between the minimum arrival time and the maximum arrival time.

The estimating of whether the driver of the crossing vehicle intends to yield may include determining the yielding intention of the driver of the crossing vehicle using an IDM, which is an intelligent driver model. The IDM may include a driver model that allows the host vehicle to travel while safely maintaining an inter-vehicle distance according to an acceleration.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
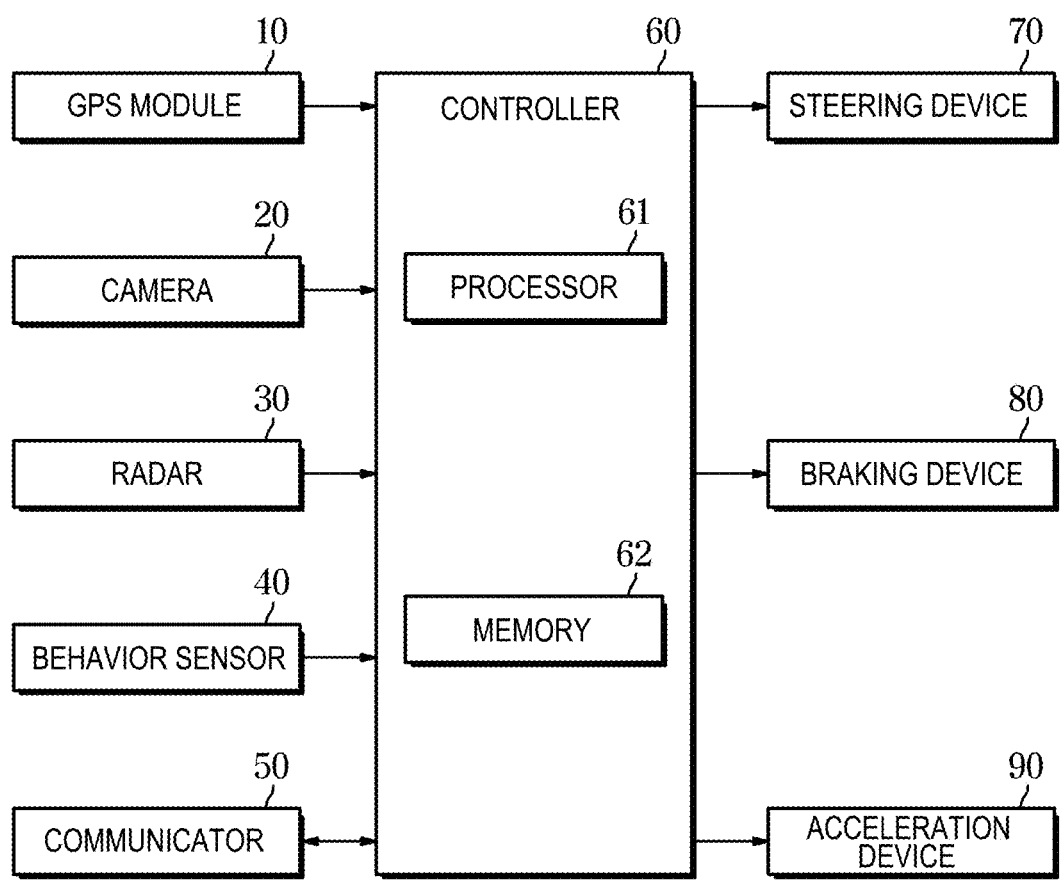
FIG. 1 is a control block diagram of a driver assistance system according to an embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

FIG. 1 is a control block diagram of a driver assistance system according to an embodiment.

Referring to FIG. 1, the driver assistance system may include a global positioning system (GPS) module 10, a camera 20, a radar 30, a behavior sensor 40, a communicator 50, and a controller 60.

The controller 60 may perform the overall control of the driver assistance system.

The controller 60 may be electrically connected to the GPS module 10, the camera 20, the radar 30, the behavior sensor 40, and the communicator 50.

The controller 60 may control a steering device 70, a braking device 80, and an acceleration device 90. The steering device 70 may change a traveling direction of a vehicle under the control of the controller 60. The braking device 80 may decelerate the vehicle by braking wheels of the vehicle under the control of the controller 60. The acceleration device 90 may accelerate the vehicle by driving an engine and/or a driving motor for providing a driving force to the vehicle under the control of the controller 60. The controller 60 may also be electrically connected to other electronic devices of the vehicle to control other electronic devices.

The GPS module 10 is a position information module for acquiring vehicle position information and may receive, for example, GPS signals including navigation data from at least one GPS satellite. The vehicle may acquire a position and traveling direction of the vehicle based on the GPS signals.

The camera 20 may be installed in the vehicle to have a forward field of view of the vehicle and may acquire forward image data of the vehicle by capturing a forward view of the vehicle. The forward image data may include the forward image data of the vehicle captured through the camera 20, is not limited thereto, and may also include image data of outward views from both sides and the rear of the vehicle.

The camera 20 may identify other vehicles around the vehicle.

The camera 20 may include a plurality of lenses and an image sensor. The image sensor may include a plurality of photodiodes for converting light into electrical signals, and the plurality of photodiodes may be disposed in the form of a two-dimensional matrix.

The camera 20 may transmit the forward image data of the vehicle to the controller 60.

The radar 30 may acquire relative positions, relative speeds, and the like with other vehicles around the vehicle.

The radar 30 may be installed in the vehicle to have an outward field of view of the vehicle and may acquire radar data for the outward field of view of the vehicle. The radar data may be data including images of other vehicles around the vehicle, which are present in the outward field of view of the vehicle. The driver assistance system may include a light detection and ranging (LiDAR) instead of the radar or include both the radar and the LiDAR.

Figure 2:
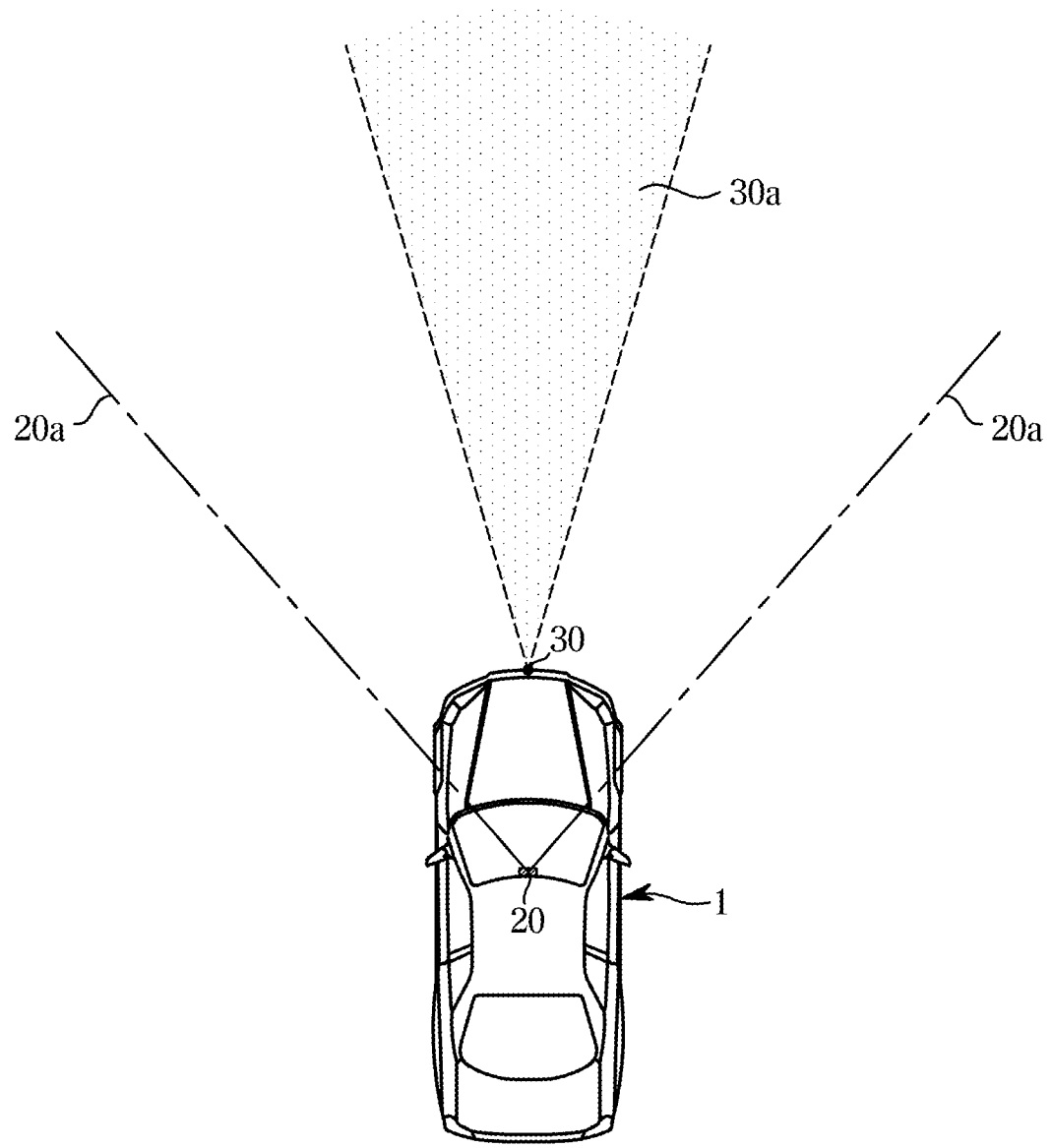
FIG. 2 shows a camera and a radar of the driver assistance system according to the embodiment.

FIG. 2 shows a camera and a radar of the driver assistance system according to the embodiment.

Referring to FIG. 2, the camera 20 may have a forward field of view 20a of a vehicle 1. For example, the camera 20 may be installed on a front windshield of the vehicle 1. The camera 20 may capture a forward view of the vehicle 1 and acquire forward image data of the vehicle 1. The forward image data of the vehicle 1 may include position information on other vehicles positioned in front of the vehicle 1.

The radar 30 may have a forward sensing area 30a of the vehicle 1. The radar 30 may be installed, for example, on a grille or a bumper of the vehicle 1.

The radar 30 may include a transmission antenna (or a transmission antenna array) for radiating transmission radio waves in a forward direction of the vehicle 1 and a reception antenna (or a reception antenna array) for receiving reflected radio waves reflected from an object. The radar 30 may acquire radar data from the transmission radio waves transmitted by the transmission antenna and the reflected radio waves received by the reception antenna.

The radar data may include distance information and speed information of other vehicles positioned in front of the vehicle 1.

The radar 30 may calculate a relative distance to another vehicle based on a phase difference (or a time difference) between the transmission radio waves and the reflected radio waves and calculate a relative speed of another vehicle based on a frequency difference between the transmission radio waves and the reflected radio waves.

Referring back to FIG. 1, the controller 60 may detect and/or identify other vehicles in front of the vehicle 1 based on the forward image data of the camera 20 and the forward radar data of the radar 30 and acquire position information (distances and directions) and speed information (relative speeds) of other vehicles in front of the vehicle 1.

Referring back to FIG. 1, the behavior sensor 40 may acquire behavior data of the vehicle. For example, the behavior sensor 40 may include a speed sensor for detecting a speed of a wheel, an acceleration sensor for detecting a lateral acceleration and a longitudinal acceleration of the vehicle, a yaw rate sensor for detecting a yaw rate of the vehicle, a steering angle sensor for detecting a steering angle of a steering wheel, and/or a torque sensor for detecting a steering torque of the steering wheel. The behavior data may include a speed of a wheel, a lateral acceleration, a longitudinal acceleration, a yaw rate, a steering angle, and/or a steering torque.

The communicator 50 may communicate with a server and receive a high definition map (hereinafter referred to as "HD map") and position information of the vehicle from the server in real time. In this case, the HD map is a map expressed in detail in units of lane lines and may include intersections, general roads, lane lines such as center lines and boundary lines, and road equipment such as traffic lights, road signs, and road surface marks.

The communicator 50 may include one or more components enabling communication with external devices and include, for example, a wireless Internet module, a short-range communication module, an optical communication module, and the like. The wireless Internet module refers to a module for wireless Internet access and may be embedded into or externally mounted on the vehicle. The wireless Internet module may transmit and receive wireless signals via a communication network based on wireless Internet techniques. The wireless Internet techniques include, for example, wireless LAN (WLAN), Wi-Fi, Wi-Fi Direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), 5G networks, 6G networks, and the like. The short-range communication module is for short-range communication and may support the short-range communication using at least one of Bluetooth™, radio frequency identification (RFID), infrared data association (IrDA), ultra-wideband (UWB), ZigBee, near field communication (NFC), Wi-Fi, Wi-Fi Direct, and wireless universal serial bus (USB) techniques. The optical communication module may include an optical transmitter and an optical receiver.

The communicator 50 may receive position and traveling information of other vehicles around the host vehicle through vehicle-to-vehicle wireless communication (V2X).

Each of the GPS module 10, the camera 20, the radar 30, the behavior sensor 40, and the communicator 50 may include a controller (electronic control unit (ECU)). The controller 60 may also be implemented as an integrated controller including the controller of the GPS module 10, the controller of the camera 20, the controller of the radar 30, the controller of the behavior sensor 40, and the controller of the communicator 50.

The controller 60 may include a processor 61 and a memory 62.

The controller 60 may include one or more processors 61. The one or more processors 61 included in the controller 60 may be integrated into one chip or may also be physically separated. In addition, the processor 61 and the memory 62 may also be implemented as a single chip.

The processor 61 may process the GPS signals acquired by the GPS module 10, the forward image data acquired by the camera 20, the radar data acquired by the radar 30, the HD map data, and the like. In addition, the processor 61 may generate control signals for autonomous traveling of the vehicle, such as a steering signal for controlling the steering device 70, a braking signal for controlling the braking device 80, and an acceleration signal for controlling the acceleration device 90.

For example, the processor 61 may include an analog signal/digital signal processor for processing the GPS signal acquired by the GPS module 10, an image signal processor for processing the forward image data of the camera 20, a digital signal processor for processing the radar data of the radar 30, and a micro control unit (MCU) for generating the steering signal, the braking signal, and the acceleration signal.

The memory 62 may store programs and/or data for the processor 61 to process the image data. The memory 62 may store programs and/or data for the processor 61 to process the radar data. In addition, the memory 62 may store programs and/or data for the processor 61 to generate the control signals for the components of the vehicle. In addition, the memory 62 may store HD map data stored inside thereof or provided from the server. The memory 62 may temporarily store data received from the GPS module 10, the camera 20, and the radar 30. In addition, the memory 62 may temporarily store results of processing the GPS signal, the image data, and the radar data by the processor 61. The memory 62 may include not only volatile memories such as a static random access memory (SRAM) and a dynamic RAM (DRAM) but also non-volatile memories such as a flash memory, a read only memory (ROM), and an erasable programmable ROM (EPROM).

The controller 60 having the above configuration determines positions of a host vehicle and a crossing vehicle, which move in a direction crossing a preceding direction of the host vehicle, around an intersection, extends a path in the preceding direction of the host vehicle to predict a future traveling path of the host vehicle within the intersection, extends a path in a preceding direction of the crossing vehicle entering the intersection to predict a future traveling path of the crossing vehicle within the intersection, determines a point at which the future traveling path of the host vehicle crosses the future traveling path of the crossing vehicle as a predicted collision position, determines whether the crossing vehicle yields when approaching the predicted collision position by comparing a braking strategy of an intelligent driver model (IDM), which is an intelligent driver model, with an estimated acceleration value of the crossing vehicle, changes the response time of the driver of the crossing vehicle depending on whether the crossing vehicle yields and then estimates a maximum arrival time when the crossing vehicle accelerates and then relatively slowly decelerates for the changed response time and a minimum arrival time when the crossing vehicle travels at a constant speed for the response time and then relatively suddenly decelerates, and determines that there is a risk of collision between the host vehicle and the crossing vehicle when a time to collision (TTC) between the host vehicle and the crossing vehicle is in a time range between the minimum arrival time and the maximum arrival time.

The driver assistance system having the above components may be, for example, an autonomous emergency braking (AEB) system.

Accordingly, the driver assistance system according to the embodiment may predict the traveling intention of the crossing vehicle at the intersection and determine the risk of collision to predict the risk of collision in advance based on the traveling intention of the crossing vehicle, thereby safely and efficiently operating the host vehicle. That is, the crossing vehicle risk situation may be determined by reflecting the yielding intention of the driver of the crossing vehicle in the intersection situation during traveling in the downtown, which may be used as an important indicator for determining a behavior of the autonomous vehicle, such as stop/start/deceleration/acceleration.

Figure 3:
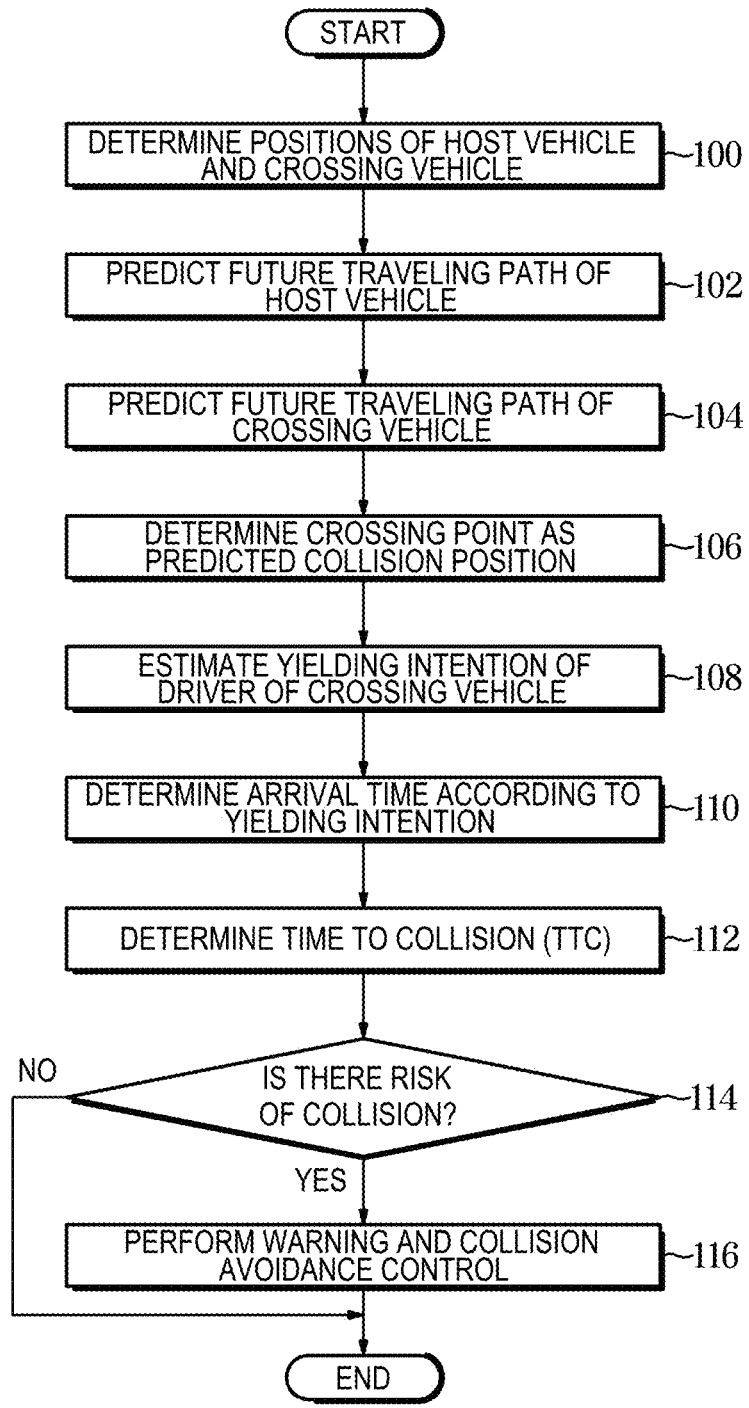
FIG. 3 is a control flowchart of a driver assistance method according to an embodiment.

FIG. 3 is a control flowchart of a driver assistance method according to an embodiment.

Referring to FIG. 3, first, the controller 60 determines the positions of the host vehicle and the crossing vehicle around the intersection (100).

The controller 60 predicts the future traveling path of the host vehicle (102).

The controller 60 determines the position and traveling state of the host vehicle within the intersection using the GPS module 10, the behavior sensor 40, and the HD map stored in the memory 62 and extends a path in the preceding direction of the host vehicle to predict the future traveling path of the host vehicle within the intersection.

The controller 60 predicts the future traveling path of the crossing vehicle at the intersection (104).

The controller 60 determines the position and traveling state of the crossing vehicle detected by the camera 20 and/or the radar 30 and extends a path in the preceding direction of the crossing vehicle to predict the future traveling path of the crossing vehicle within the intersection.

The controller 60 determines a crossing point at which the future traveling path of the host vehicle meets and crosses the future traveling path of the crossing vehicle as the predicted collision position at which the host vehicle collides with the crossing vehicle (106).

Figure 4:
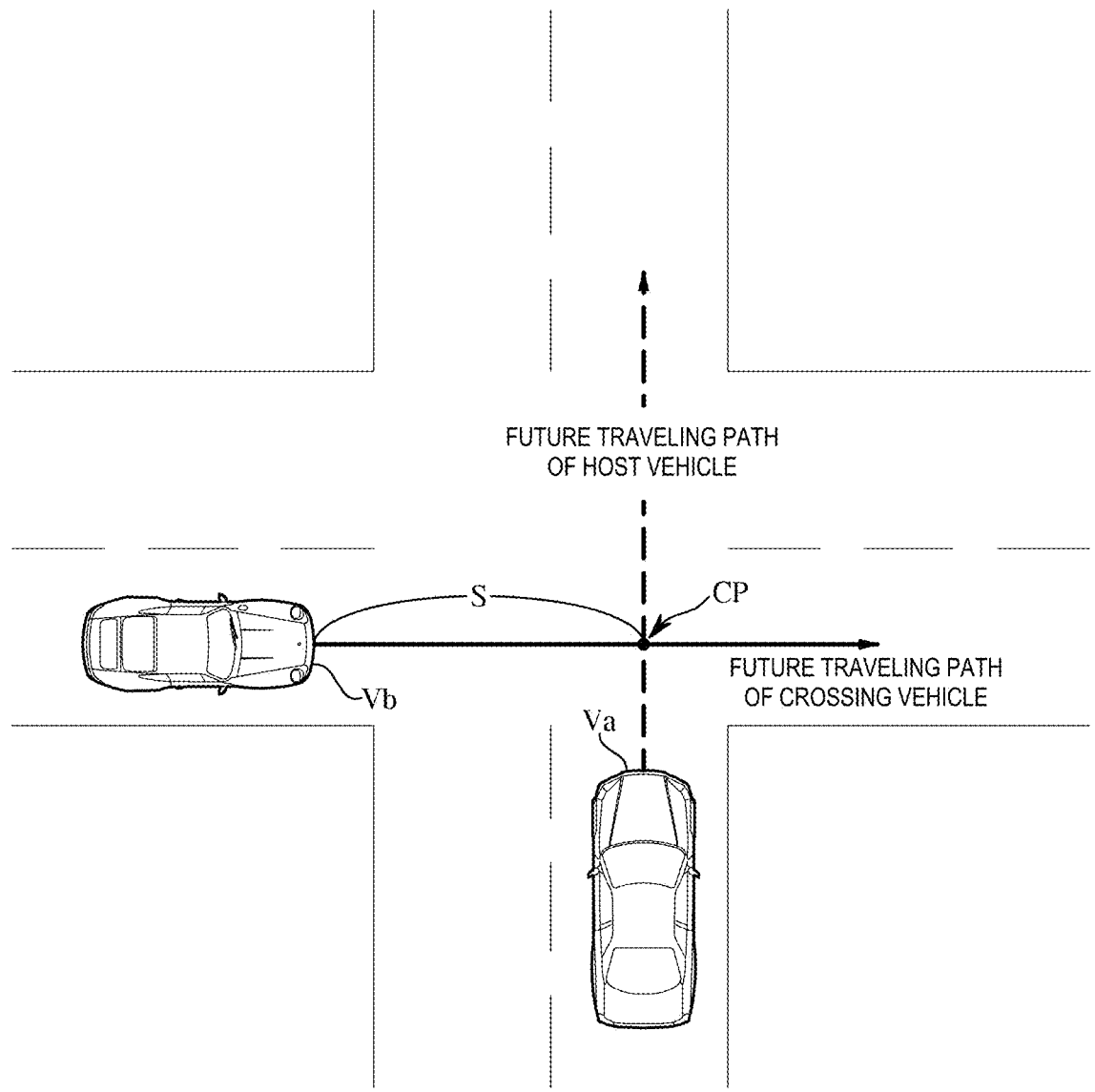
FIG. 4 shows a positional relationship between a host vehicle traveling straight and a crossing vehicle at an intersection in the driver assistance system according to the embodiment.

FIG. 4 shows a positional relationship between a host vehicle traveling straight and a crossing vehicle at an intersection in the driver assistance system according to the embodiment.

Referring to FIG. 4, it is assumed that a host vehicle Va travels straight across the intersection from south to north, and it is assumed that a crossing vehicle Vb travels straight across the intersection from west to east.

A future traveling path of the host vehicle Va is indicated by a dotted line, and a future traveling path of the crossing vehicle Vb is indicated by a solid line.

A crossing point CP at which the future traveling path of the host vehicle Va, which extended the path in the preceding direction of the host vehicle Va into the intersection, meets and crosses the future traveling path of the crossing vehicle Vb, which extended the path in the preceding direction of the crossing vehicle Vb into the intersection as the predicted collision position at which the host vehicle Va collides with the crossing vehicle Vb.

The remaining distance S until the crossing vehicle Vb reaches the predicted collision position may be determined from the position of the crossing vehicle Vb and the predicted collision position.

Referring back to FIG. 3, the controller 60 estimates the intention of the driver of the crossing vehicle when the crossing vehicle approaches the predicted collision position (108).

The IDM, which is an intelligent driver model, used for a driver longitudinal modeling in traffic simulation, may be used to determine the yielding intention of the driver of the crossing vehicle. Whether the crossing vehicle has the yielding intention is determined when approaching the predicted collision position by comparing the braking strategy of the IDM with the estimated acceleration value of the crossing vehicle. The IDM is a model designed to travel while safely maintaining an inter-vehicle distance according to a recognition response times and accelerations of individual vehicles. The IDM is a model developed to enable stable acceleration and deceleration so that a vehicle travels at maximum speed while maintaining the minimum safety distance.

Generally, the braking strategy of the IDM can be expressed as in Equation 1 below.

$$\dot{v}_{brake} = -a_{max}\left(\frac{s^*}{s}\right)^2$$ [Equation 1]

$$s^* = s_0 + \max\left(0, vT + \frac{v\Delta v}{2\sqrt{a_{max}b_{max}}}\right)$$

Here, v denotes a current speed, Δv denotes a relative speed, t denotes a time gap, so denotes a minimum gap, $b_{max}$ denotes comfortable deceleration, and $a_{max}$ denotes a maximum acceleration.

Since the braking strategy is a scenario of stopping at the crossing point CP, when $s_0$ and T are set to zero in Equation 1, a braking profile to the crossing point CP may be defined as in Equation 2 below.

$$\dot{v}_{brake} = -\frac{a_{max}v^2(\Delta v)^2}{4a_{max}b_{max}(\Delta s)2}$$ [Equation 2]

$$= -\left(\frac{v^2}{2s}\right)^2 \frac{1}{b_{max}}$$

$$= -b_{kin}\left(\frac{b_{kin}}{b_{max}}\right)$$

Here, $b_{max}$ denotes a tuning parameter value and is, for example, 1.5 m/s².

The yielding intention of the driver of the crossing vehicle may be determined by comparing the braking profile to the crossing point CP with the acceleration of the crossing vehicle.

In the determining of the yielding intention of the driver of the crossing vehicle, the yielding intention may be derived as a probability value using a heuristic membership function.

Figure 5:
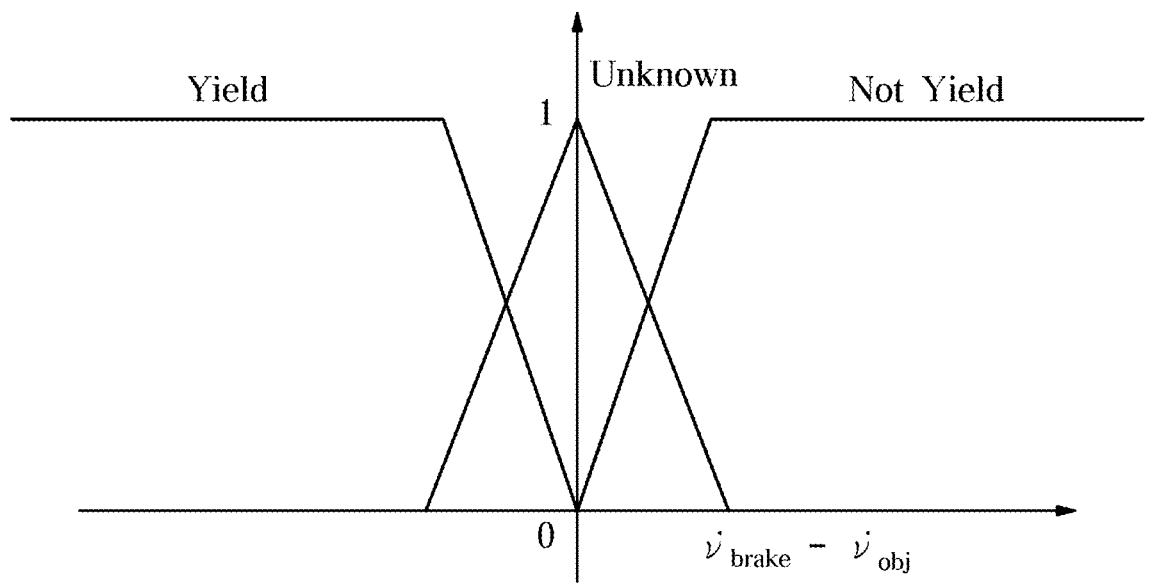
FIG. 5 is a view for determining the yielding intention of a driver of the crossing vehicle in the driver assistance system according to the embodiment.

FIG. 5 is a view for determining the yielding intention of a driver of the crossing vehicle in the driver assistance system according to the embodiment.

FIG. 5 shows an example of the membership function according to the yielding intention corresponding to a fuzzy input $\dot{v}_{brake}$-$\dot{v}_{obj}$. $\dot{v}_{obj}$ denotes an acceleration of the crossing vehicle.

The membership function may include a plurality of members defined as a value between 0 and 1. The shown membership function has a triangular distribution, but this is only illustrative, and the membership function may have various types of distributions, such as a triangular, quadrangular, or Gaussian distribution.

The membership function outputs Yield, Not Yield, or Unknown according to the fuzzy input $\dot{v}_{brake}$-$\dot{v}_{obj}$. Yield indicates that the driver of the crossing vehicle intends to yield, Not Yield indicates that the driver of the crossing vehicle does not intend to yield, and Unknown indicates a state in which it is not known whether the driver of the crossing vehicle intends to yield.

Referring back to FIG. 3, the controller 60 changes the response time of the driver of the crossing vehicle depending on whether the crossing vehicle yields and then estimates the maximum arrival time when the crossing vehicle accelerates and then relatively slowly decelerates for the changed response time and a minimum arrival time when the crossing vehicle travels at a constant speed for the response time and then relatively suddenly decelerates (110).

Figure 6:
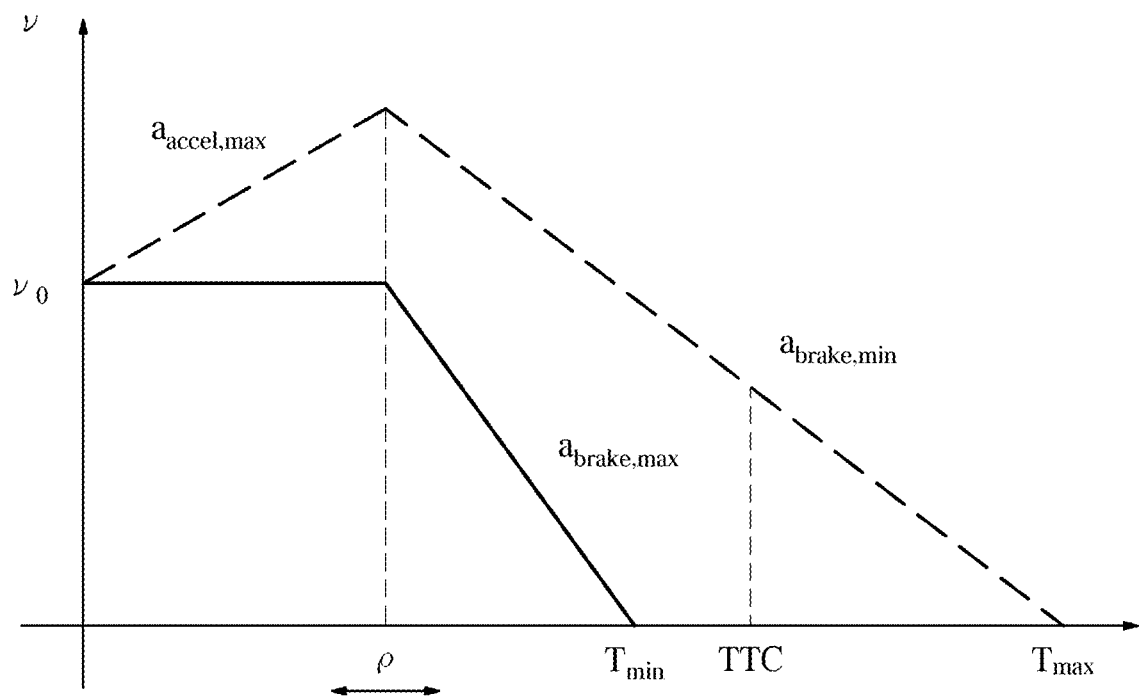
FIG. 6 is a view for determining an arrival time when a host vehicle accelerates or travels at a constant speed using a response time of the driver of the crossing vehicle depending on whether the driver of the crossing vehicle yields in the driver assistance system according to the embodiment.

FIG. 6 is a view for determining an arrival time when a host vehicle accelerates or travels at a constant speed using a response time of the driver of the crossing vehicle depending on whether the driver of the crossing vehicle yields in the driver assistance system according to the embodiment.

Referring to FIG. 6, a response time p of the driver of the crossing vehicle is changed depending on the determination of whether the driver of the crossing vehicle yields, and the arrival time when the crossing vehicle accelerates or travels at a constant speed for the changed response time is calculated.

Arrival times when the crossing vehicle arrives positions at which the crossing vehicle stops when accelerating for the response time p and traveling at a constant speed are respectively defined as a minimum arrival time $T_{min}$ and a maximum arrival time $T_{max}$.

The minimum arrival time $T_{min}$ and maximum arrival time $T_{max}$ can be respectively expressed as in Equations 3 and 4 below.

$$T_{min} = \rho + \frac{v_0}{a_{brake,max}} \qquad \text{[Equation 3]}$$

$$T_{max} = \rho + \frac{v_0 + \rho a_{accel,max}}{a_{brake,min}} \qquad \text{[Equation 4]}$$

Here, p denotes the reaction time of the driver of the crossing vehicle, v0 denotes a speed of the crossing vehicle, $a_{accel,max}$ denotes the maximum acceleration of the crossing vehicle, $a_{brake,max}$ denotes the maximum deceleration of the crossing vehicle, and $a_{brake,min}$ denotes the minimum deceleration of the crossing vehicle. $a_{accel,max}$, $a_{brake,max}$, and $a_{brake,min}$ denote preset values. p denotes a value changed depending on the yielding intention of the driver of the crossing vehicle and may be, for example, 0.5 s for Yield, 2 s for Unknown, and 3.5 s for Not Yield. That is, the response time of the driver in the case in which the driver intends to yield is set shorter than that of the case in which the driver does not intend to yield.

The minimum arrival time $T_{min}$ may be the time when the crossing vehicle travels at a constant speed for the response time of the driver, then decelerates at $a_{brake,max}$, and stops. That is, the minimum arrival time $T_{min}$ indicates the arrival time when the crossing vehicle travels at the constant speed for the response time of the driver and then suddenly decelerates.

The maximum arrival time $T_{max}$ may be the time when the crossing vehicle accelerates at $a_{accel,max}$, then decelerates at $a_{brake,max}$ for the response time of the driver, and stops. That is, the maximum arrival time $T_{max}$ indicates the arrival time when the crossing vehicle accelerates for the response time of the driver and then slowly decelerates.

Referring back to FIG. 3, the controller 60 determines the TTC of the host vehicle and the crossing vehicle (112) and determines whether the risk of collision between the host vehicle and the crossing vehicle is present based on the TTC, the minimum arrival time $T_{min}$, and the maximum arrival time $T_{max}$. When there is the risk of collision, the controller 60 may perform collision avoidance control while warning the driver of the host vehicle (116).

Figure 7:
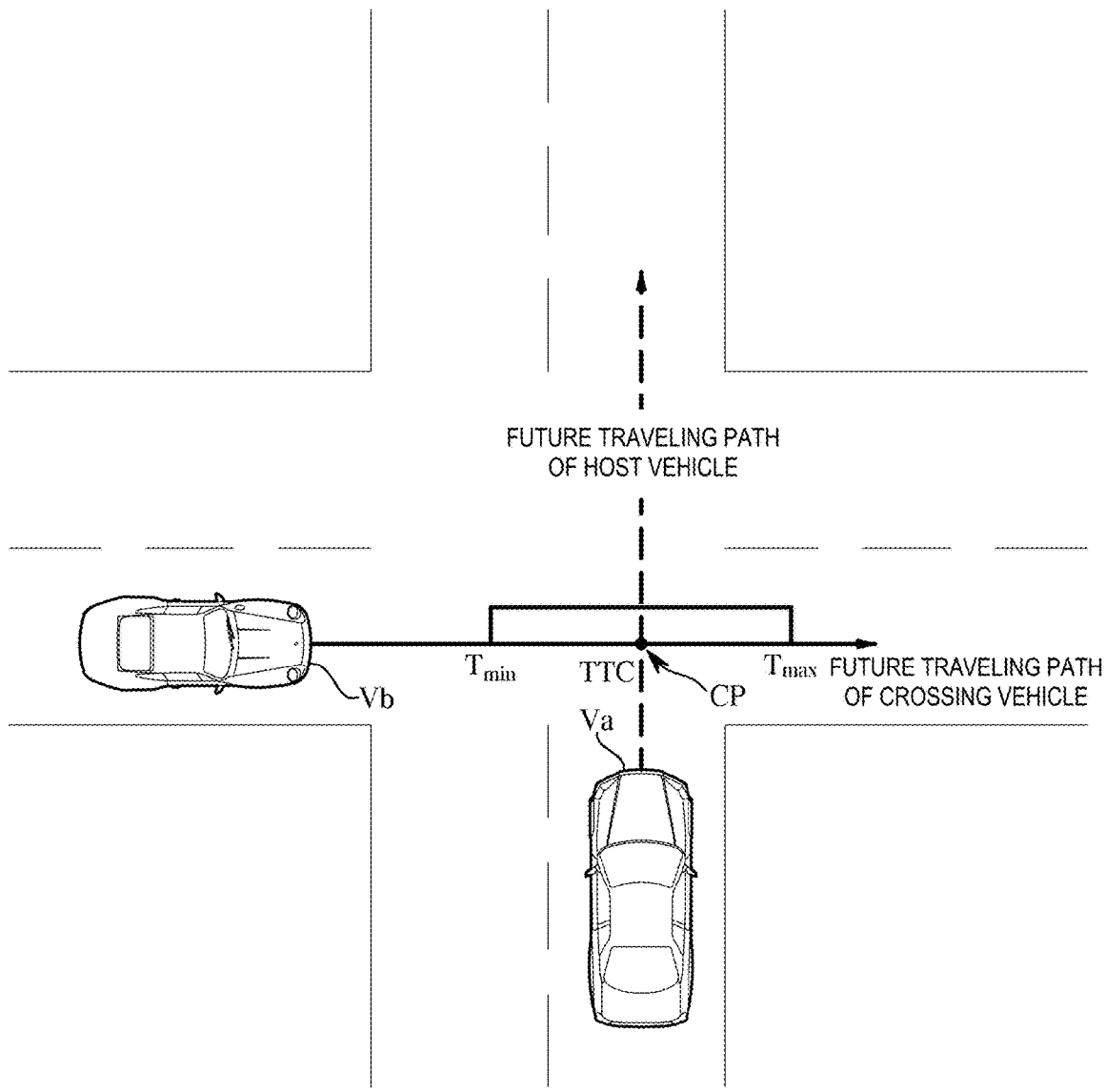
FIG. 7 is a view for determining a risk of collision between the host vehicle and the crossing vehicle by reflecting whether the driver of the crossing vehicle yields in the driver assistance system according to the embodiment.

FIG. 7 is a view for determining a risk of collision between the host vehicle and the crossing vehicle by reflecting whether the driver of the crossing vehicle yields in the driver assistance system according to the embodiment.

Referring to FIG. 7, when the TTC of the host vehicle and the crossing vehicle is in the time range between the minimum arrival time and the maximum arrival time, it is determined that there is the risk of collision between the host vehicle Va and the crossing vehicle Vb.

Figure 8:
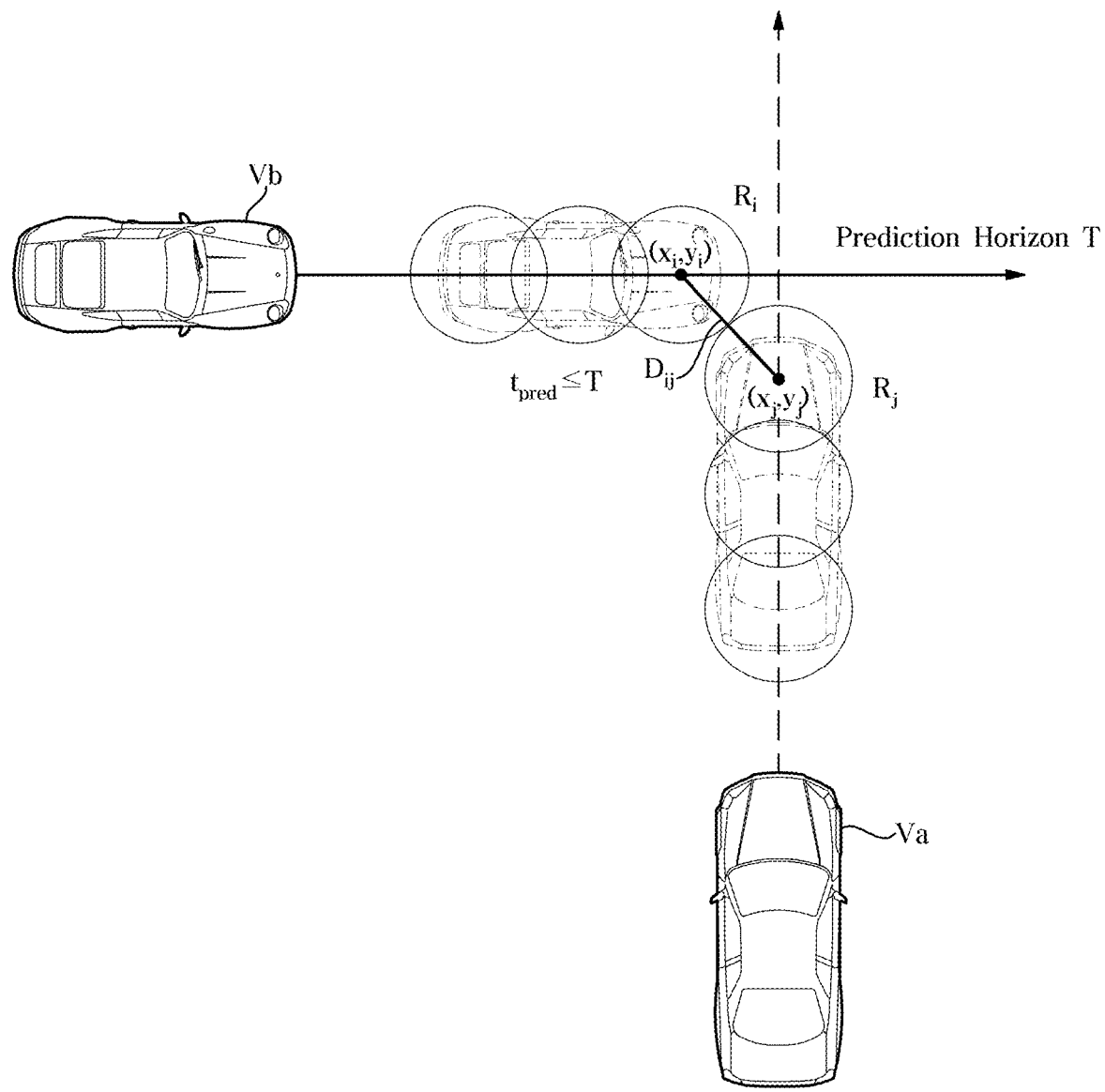
FIG. 8 is a view for determining a time to collision (TTC) between the host vehicle and the crossing vehicle in the driver assistance system according to the embodiment.

FIG. 8 is a view for determining a TTC between the host vehicle and the crossing vehicle in the driver assistance system according to the embodiment.

Referring to FIG. 8, the TTC on the future travel path of the intersecting vehicle and the future travel path of the host vehicle is calculated.

After dimensions of each vehicle are expressed in the form of a set of circles, whether a collision of each circle is present for each step within a prediction horizon T (e.g., 3 s) of the crossing vehicle is determined, and a time step at which the collision has occurred is defined as the TTC.

A center distance $D_{ij}$ between arbitrary circles of the host vehicle Va and the crossing vehicle Vb can be expressed as in Equation 5 below.

$$D_{i,j} = \sqrt{(x_i - x_j)^2 + (y_i - y_j)^2} \qquad \text{[Equation 5]}$$

When $D_{ij} \leq R_i + R_j$ at an arbitrary time $t_{pred}$ ($t_{pred} \leq T$) in the future, $t_{pred}$ is determined to be the TTC.

Accordingly, the driver assistance system according to the embodiment may predict the traveling intention of the crossing vehicle at the intersection and determine the risk of collision to predict the risk of collision in advance based on the traveling intention of the crossing vehicle, thereby safely and efficiently operating the host vehicle. The crossing vehicle risk situation may be determined by reflecting the yielding intention of the driver of the crossing vehicle in the intersection situation during traveling in the downtown, which may be used as an important indicator for determining a behavior of the autonomous vehicle such as stop, start, deceleration, acceleration, etc.

As is apparent from the above description, it is possible to predict the traveling intention of a crossing vehicle at an intersection, determine a degree of risk of collision, and predict the risk of collision in advance, thereby safely and efficiently operating a host vehicle.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A system comprising:
a memory; and
a processor configured to process image data from a camera and a radar data from a radar using programs stored in the memory,
wherein the processor is configured to:
determine a future traveling path of a host vehicle based on a preceding direction of the host vehicle from the image data and/or the radar data;
determine a future traveling path of a crossing vehicle based on a preceding direction of the crossing vehicle moving in a direction crossing the preceding direction of the host vehicle;
determine a point at which the future traveling path of the host vehicle crosses the future traveling path of the crossing vehicle as a predicted collision position;
determine whether yielding intention of a driver of the crossing vehicle is present when the crossing vehicle approaches the predicted collision position; and
avoid a collision with the crossing vehicle based on the yielding intention of the driver of the crossing vehicle,
wherein the processor is configured to determine whether the yielding intention of the driver of the crossing vehicle is present based on comparing a braking profile when the crossing vehicle stops at the predicted collision position with an acceleration of the crossing vehicle.

2. The system of claim 1, wherein the processor is configured to:
determine a minimum arrival time and a maximum arrival time at which the crossing vehicle arrives at a position at which the crossing vehicle stops based on the yielding intention of the driver of the crossing vehicle;
compare a time to collision (TTC) between the host vehicle and the crossing vehicle with the minimum arrival time and the maximum arrival time;
determine a risk of collision between the host vehicle and the crossing vehicle based on the comparing the TTC with the minimum arrival time and the maximum arrival time; and
avoid the collision with the crossing vehicle based on the risk of collision between the host vehicle and the crossing vehicle.

3. The system of claim 2, wherein the processor is configured to:
change a response time of the driver of the crossing vehicle depending on the yielding intention of the driver of the crossing vehicle; and
determine the maximum arrival time and the minimum arrival time based on acceleration or deceleration of the crossing vehicle during the response time.

4. The system of claim 3, wherein the processor is configured to:
determine, as the maximum arrival time, an arrival time when the crossing vehicle accelerates and then decelerates during the response time; and
determine, as the minimum arrival time, an arrival time when the crossing vehicle travels at a constant speed and then decelerates during the response time.

5. The system of claim 4, wherein the processor is configured to:
determine, as the maximum arrival time, an arrival time when the crossing vehicle accelerates and then relatively slowly decelerates during the response time; and
determine, as the minimum arrival time, an arrival time when the crossing vehicle travels at the constant speed time and then relatively suddenly decelerates during the response.

6. The system of claim 4, wherein the processor is configured to change the response time of the driver of the crossing vehicle so that a response time of the driver of the crossing vehicle when the driver of the crossing vehicle intends to yield is shorter than a response time when the driver of the crossing vehicle does not intend to yield.

7. The system of claim 2, wherein the processor is configured to determine that there is the risk of collision between the host vehicle and the crossing vehicle when the TTC between the host vehicle and the crossing vehicle is in a time range between the minimum arrival time and the maximum arrival time.

8. The system of claim 1, wherein the processor is configured to:
compare the braking profile when the crossing vehicle stops at the predicted collision position with the acceleration of the crossing vehicle in an intelligent driver model (IDM).

9. The system of claim 8, wherein the processor is configured to determine whether the driver of the crossing vehicle intends to yield using a membership function into which an acceleration difference between the braking profile and the acceleration of the crossing vehicle is input.

10. The system of claim 1, wherein the processor is configured to determine the yielding intention of the driver of the crossing vehicle using an intelligent driver model (IDM), and
the IDM includes a driver model that allows the host vehicle to travel while safely maintaining an inter-vehicle distance according to an acceleration.

11. A method comprising:
acquiring, by a camera having a field of view around a host vehicle, image data;
acquiring, by a radar having a sensing area around the host vehicle, radar data;
determining a future traveling path of the host vehicle based on a preceding direction of the host vehicle from the image data and/or the radar data;
determining a future traveling path of a crossing vehicle based on a preceding direction of the crossing vehicle moving in a direction crossing the preceding direction of the host vehicle;
determining a point at which the future traveling path of the host vehicle crosses the future traveling path of the crossing vehicle as a predicted collision position;
determining whether a driver of the crossing vehicle intends to yield when the crossing vehicle approaches the predicted collision position; and
avoiding a collision with the crossing vehicle based on the yielding intention of the driver of the crossing vehicle,
wherein the determining whether the driver of the crossing vehicle to yield is based on comparing a braking profile when the crossing vehicle stops at the predicted collision position with an acceleration of the crossing vehicle.

12. The method of claim 11, wherein the avoiding of the collision with the crossing vehicle comprises:
   determining a minimum arrival time and a maximum arrival time at which the crossing vehicle arrives at a position at which the crossing vehicle stops based on the yielding intention of the driver of the crossing vehicle;
   comparing a time to collision (TTC) between the host vehicle and the crossing vehicle with the minimum arrival time and the maximum arrival time;
   determining a risk of collision between the host vehicle and the crossing vehicle based on the comparing of the TTC with the minimum arrival time and the maximum arrival time; and
   avoiding a collision with the crossing vehicle based on the risk of collision between the host vehicle and the crossing vehicle.

13. The method of claim 12, wherein the determining of the minimum arrival time and the maximum arrival time comprises:
   changing a response time of the driver of the crossing vehicle depending on the yielding intention of the driver of the crossing vehicle; and
   determining the maximum arrival time and the minimum arrival time based on acceleration or deceleration of the crossing vehicle during the response time.

14. The method of claim 13, wherein the determining of the minimum arrival time and the maximum arrival time comprises:
   determine, as the maximum arrival time, an arrival time when the crossing vehicle accelerates and then decelerates during the response time; and
   determine, as the minimum arrival time, an arrival time when the crossing vehicle travels at a constant speed and then decelerates during the response time.

15. The method of claim 14, wherein the determining of the minimum arrival time and the maximum arrival time comprises:
   determine, as the maximum arrival time, an arrival time when the crossing vehicle accelerates and then relatively slowly decelerates during the response time; and
   determine, as the minimum arrival time, an arrival time when the crossing vehicle travels at the constant speed and then relatively suddenly decelerates during the response time.

16. The method of claim 14, wherein the determining of the minimum arrival time and the maximum arrival time comprises changing the response time of the driver of the crossing vehicle so that a response time of the driver of the crossing vehicle when the driver of the crossing vehicle intends to yield is shorter than a response time when the driver of the crossing vehicle does not intend to yield.

17. The method of claim 12, wherein the determining of the risk of collision between the host vehicle and the crossing vehicle comprises determining that there is the risk of collision between the host vehicle and the crossing vehicle when the TTC between the host vehicle and the crossing vehicle is in a time range between the minimum arrival time and the maximum arrival time.

18. The method of claim 11,
   wherein the comparing of the braking profile when the crossing vehicle stops at the predicted collision position with the acceleration of the crossing vehicle in an intelligent driver model (IDM).

19. The method of claim 18, wherein the determining of whether the driver of the crossing vehicle intends to yield comprises estimating whether the driver of the crossing vehicle intends to yield using a membership function into which an acceleration difference between the braking profile and the acceleration of the crossing vehicle is input.

20. The method of claim 11, wherein the estimating of whether the driver of the crossing vehicle intends to yield comprises determining the yielding intention of the driver of the crossing vehicle using an intelligent driver model (IDM), and the IDM includes a driver model that allows the host vehicle to travel while safely maintaining an inter-vehicle distance according to an acceleration.

* * * * *